United States Patent [19]

Metz et al.

[11] Patent Number: 5,763,956
[45] Date of Patent: Jun. 9, 1998

[54] END FACE TRACK SEAL WITH DIRT SEAL

[75] Inventors: Jerry A. Metz, Morton; Billy R. Bedford; Steve L. Arianoutsos, both of Peoria, all of Ill.

[73] Assignee: Caterpillar Inc., Peoria, Ill.

[21] Appl. No.: 645,883

[22] Filed: May 14, 1996

Related U.S. Application Data

[63] Continuation of Ser. No. 427,530, Apr. 24, 1995, abandoned.

[51] Int. Cl.$^6$ ............................... B60S 1/62; F16J 15/38
[52] U.S. Cl. ........................... 305/102; 305/103; 277/92
[58] Field of Search ........................... 277/92, 84, 95, 277/212 FB, 88, 38, 42; 305/100, 102, 103, 11

[56] References Cited

U.S. PATENT DOCUMENTS

| | | | |
|---|---|---|---|
| 3,273,901 | 9/1966 | Schmengler | 277/92 |
| 4,094,516 | 6/1978 | Morley et al. | 277/92 |
| 4,240,642 | 12/1980 | Roussin | 305/103 |
| 4,275,890 | 6/1981 | Reinsma | 277/84 |
| 4,284,281 | 8/1981 | Reinsma | 277/84 |

FOREIGN PATENT DOCUMENTS

| | | | |
|---|---|---|---|
| 3836717 | 5/1990 | Germany | 277/92 |
| 838219 | 6/1981 | U.S.S.R. | 277/84 |

*Primary Examiner*—Daniel G. DePumpo
*Attorney, Agent, or Firm*—Larry G. Cain; O. Gordon Pence; William B. Heming

[57] ABSTRACT

An end face seal for sealing between first and second articulately coupled members of a track joint is disclosed. The seal is provided with a flexible dirt shield of elastomeric material. The dirt shield extends radially outwardly from the seal ring and has a distal end that is adapted to sealingly engage the first member at a location externally of the load ring to prevent the ingress of abrasive materials between the seal ring and the load ring and eliminate the abrasive erosion of the load ring, thereby maintaining the axial seal bearing force of the load ring against the seal ring throughout the useful life of the seal.

6 Claims, 4 Drawing Sheets

Fig_2_

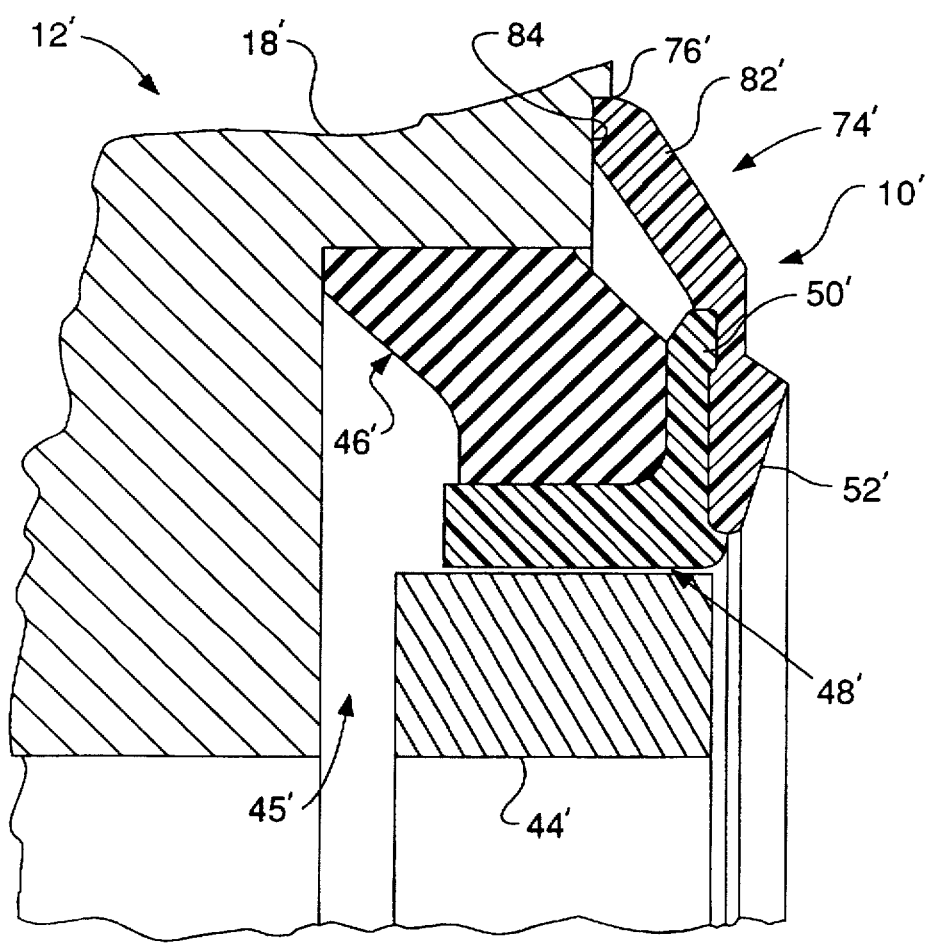
Fig_4_

5,763,956

END FACE TRACK SEAL WITH DIRT SEAL

This is a file wrapper continuation of application Ser. No. 08/427,530, filed Apr. 24, 1995, now abandoned.

TECHNICAL FIELD

This invention relates generally to an end face seal for use in sealing articulating pin joints of track and the like and, more particularly, to an improved end face seal with a dirt shield to prevent the ingress of dirt into the seal cavity between the seal ring and the load ring of the seal.

BACKGROUND ART

End face seals, of the type disclosed in U.S. Pat. No. 4,262,914 for an End Face Seal Assembly issued Apr. 21, 1981 to Robert D. Roley and assigned to the assignee hereof, are used to seal oil in and dirt out of track pin joints. Such end face seals are subjected to severe climatic conditions and exposure to very abrasive external contaminants such as dirt, mud, sand, water and other forms of grit, minerals and chemicals that cause or accelerate abrasive wear of the seal components. In particular, dirt can become packed in the seal cavity between the rubber load ring and the seal ring of such an end face seal assembly. Movement between the load ring and the seal ring in the presence of such abrasives may cause portions of the load ring to be eroded away. Such eroding lessens the effectiveness of the load ring as an axial loading member, which reduces the axial force such load ring is capable of exerting on the seal ring. As a result, the primary sealing provided by the seal ring is eventually lost, allowing the loss of the track joints precious lubricating oil and the ingress of abrasive contaminates into the joint itself.

The present invention is directed to overcoming the shortcomings of load ring erosion experienced in prior seal assemblies by providing a seal ring that has a dirt shield to prevent the ingress of abrasive materials into the seal cavity between the seal ring and the load ring.

DISCLOSURE OF THE INVENTION

In accordance with one aspect of the present invention, there is provided an end face seal for sealing between first and second articulately coupled members of a track joint. The first member has a seal cavity for mounting the seal. The seal cavity opens toward a radially disposed sealing face on the second member. The seal includes a seal ring and a load ring, with the seal ring having an axially protruding seal lip on one end thereof, which is positionable in axial sealing engagement against the sealing face of the second member. The load ring is adapted to urge the seal ring into axial sealing engagement against the sealing face. The seal includes a flexible dirt shield of elastomeric material that is formed on said seal ring. The shield extends radially outwardly from the seal ring and has a distal end that is adapted to sealingly engage the first member at a location externally of said load ring to prevent the ingress of abrasive materials into the seal cavity between the seal ring and the load ring.

BRIEF DESCRIPTION OF THE DRAWINGS

FIG. 4 is an enlarged cross-sectional view similar to FIG. 2, but illustrating another embodiment of the dirt shield.

BEST MODE FOR CARRYING OUT THE INVENTION

Figure 1:
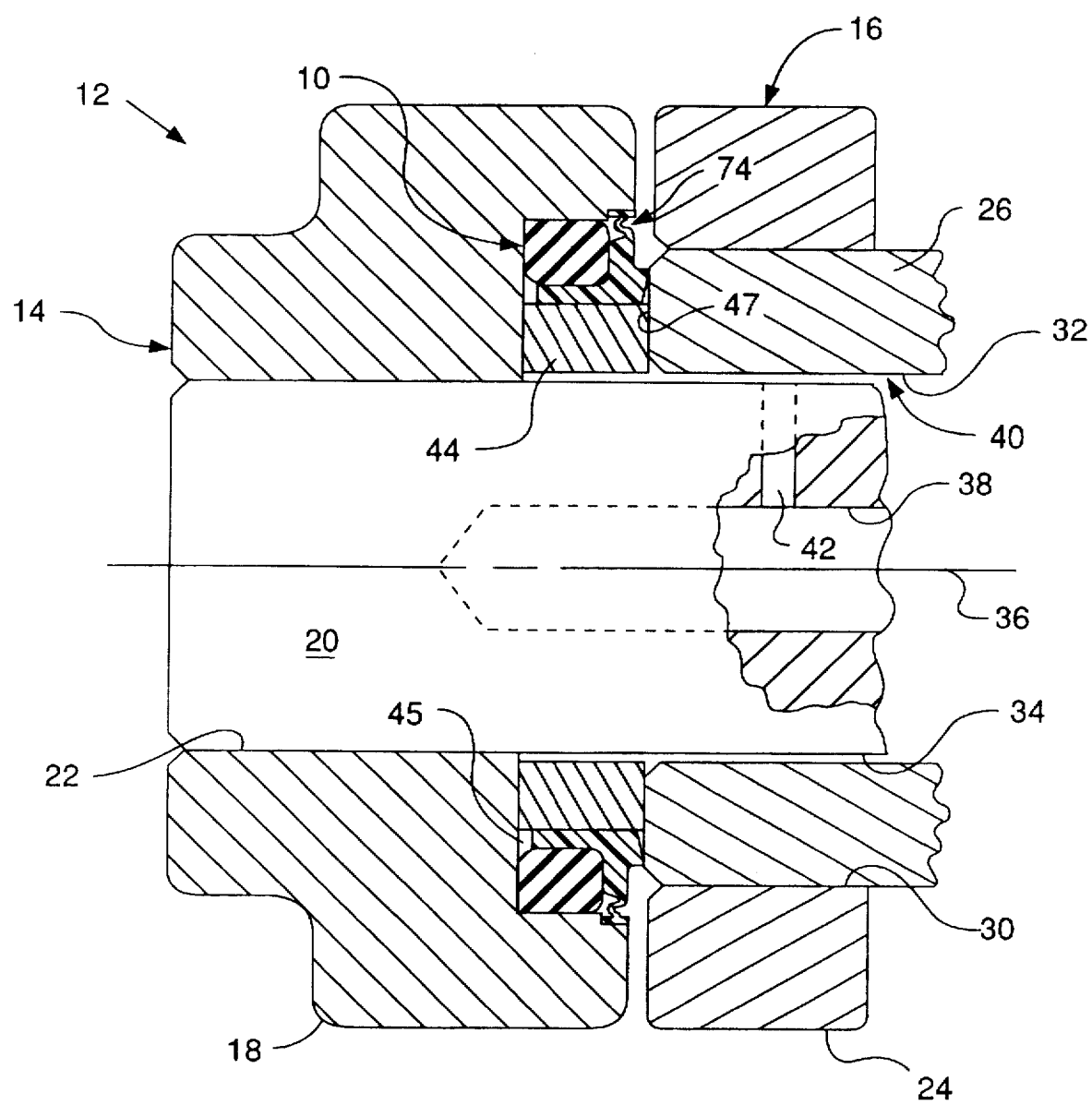
FIG. 1 is a fragmentary cross-sectional view of a portion of a track joint having an end face seal equipped with a dirt shield embodying the principles of the present invention.
Figure 2:
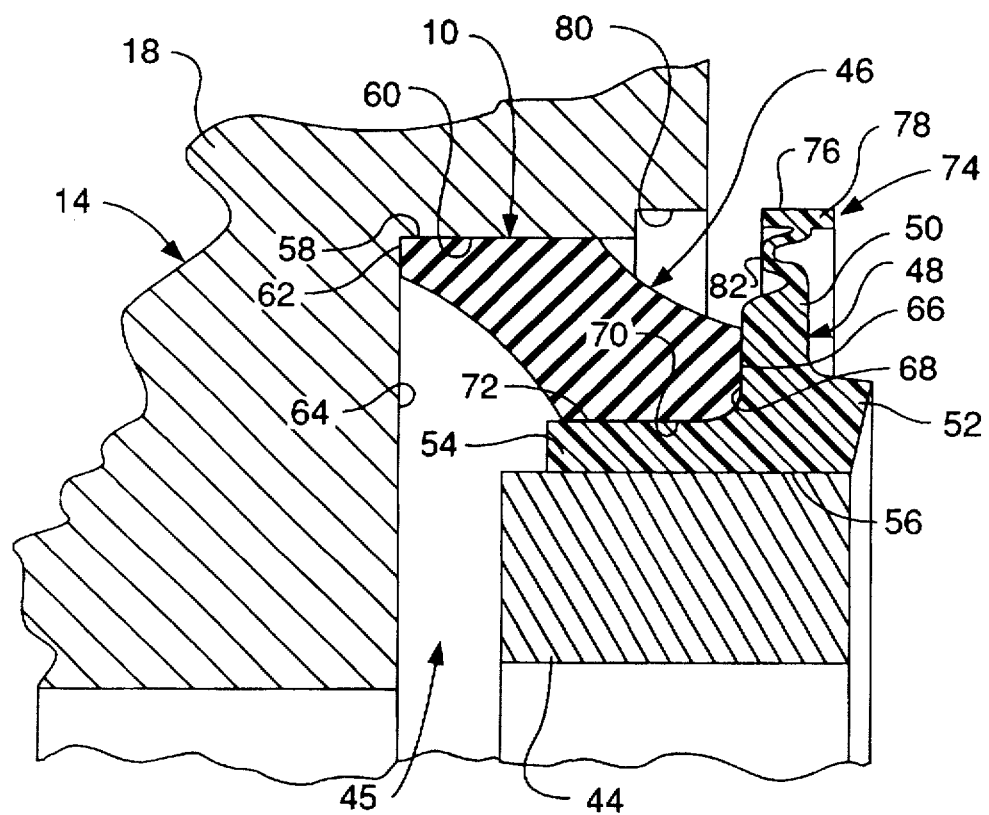
FIG. 2 is an enlarged cross-sectional view of one of the track joint members and of the seal shown in FIG. 1, but with the seal being in an unloaded condition.

Referring more particularly to the drawings, an end face seal embodying the principles of the present invention is generally indicated at 10 in FIGS. 1 and 2 for use in sealing a track joint 12, one end of which is illustrated in FIG. 1, of an endless track chain for a track-type tractor or the like (not shown).

The track joint 12 may be of any conventional construction, which commonly includes a first member 14 that is pivotally coupled to a second member 16. The first member comprises an outboard end link portion 18 and a pin 20, which are secured by pressing the pin into a pin bore 22 provided through the outboard end link portion 18. The second member 16 comprises an inboard end link portion 24 and a cylindrical bushing 26, which are secured by pressing the bushing 26 into a bushing bore 30 through the inboard end link portion 24. The bushing 26 has an inner bore 32 sized to rotatably receive the outer diameter surface 34 of the pin 20 to permit relative pivotal movement between the first member 14 and the second member 16 about a central axis 36. The pin 20 preferably has a plugged central bore 38, which serves as a reservoir for lubricating oil. Such lubricating oil is communicated to the bearing interface 40 between the bore 32 of the bushing 26 and the outer surface 34 of the pin 20 through a cross bore 42. A steel spacer ring 44 is used to maintain the first member 14 at a predetermined axial separation from the second member 16 of the track joint 12, it being understood by those skilled in the track art that only one end of the track joint 12 is shown in FIG. 1 and that the other end of such joint is essentially a mirror image of the end shown. The seal 10 and spacer ring 44 are concentric to the central axis 36 between the first and second members 14, 16 of the track joint 12, with the seal being disposed radially outboard of the spacer ring. The seal 10 and spacer ring 44 are located within a seal cavity provided by a counterbore 45 in the outboard end link portion 18. The seal cavity or counterbore 45 opens toward a radially disposed sealing end face 47 on the bushing 26 of second member 16.

Figure 3:
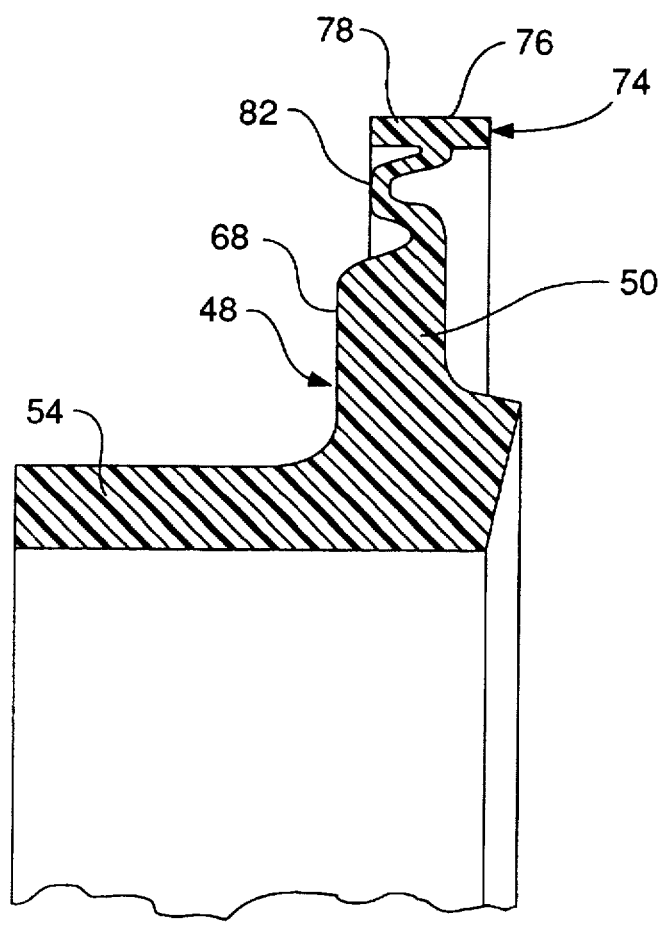
FIG. 3 is an enlarged cross-sectional view of the seal ring by itself.

As better shown in FIG. 2, the seal 10 includes a load ring 46 and a seal ring 48. In the embodiment shown in FIGS. 1-3, seal ring 48 is constructed of a unitary plastic material, preferably polyurethane, and has a radial flange portion 50. The radial flange portion 50 has a seal lip 52 projecting from one side thereof and an axial flange portion 54 extending from the other side thereof. As the polyurethane material of seal ring 48 is flexible, the seal ring 48 has an inner diameter surface 56 that is sized to contact the outer diameter of the spacer ring 44 in order for the seal ring to be radially supported by the spacer ring.

The load ring 46 is of an oil resistant elastomeric material, preferably a synthetic rubber, and has a diagonally canted configuration when in a free state as shown in FIG. 2. At one end, the load ring 46 has an outer surface 58, which is seated against a cylindrical side surface 60 of the counterbore 45 and an inner end surface 62 seated against a bottom wall 64 of the counterbore 45. At the other end, the load ring 46 has an outer end surface 66 seated against a radial inner surface 68 of the radial flange portion 50 and an inner cylindrical surface 70 seated against an outer diameter surface 72 of the axial flange portion 54.

Of particular importance to the present invention is the inclusion of a dirt shield 74 on the seal 10. In the embodiment shown in FIGS. 1–3, dirt shield 74 is integral with and of the same material as the seal ring 48. In particular, the dirt shield 74 extends outwardly from the radial flange portion 50 and has a distal end 76 which is adapted to sealingly engage the outboard end link portion 18 of the first member 14 at a location externally of the load ring 46 to prevent the ingress of abrasive materials between the seal ring 48, the load ring 46, and the side surface 60 of the counterbore 45. To accomplish this, the distal end 76 has a ring portion 78 of a size that is somewhat greater than that of a stepped end portion 80 provided in the counterbore 45 such that when the ring portion 78 is fitted into the stepped end portion 80, the interference fit therebetween is sufficient to maintain the distal end 76 within the end portion 80 of the counterbore 45 and seal off the counterbore 45 from any ingress of abrasives. The dirt shield 74 is provided with a body portion 82 intermediate the ring portion 78 and the radial flange portion 50 of the seal ring 48. The body portion 82 is constructed in the form of a thin, flexible bellows to accommodate a predetermined amount of axial displacement or movement between the seal ring 48 an the first member 14 without disturbing the sealing engagement of the distal end 76 with the stepped end portion 80 during assembly or operation.

Another embodiment of the present invention is shown in FIG. 4, wherein like components have been given like reference numerals with a "prime" being added as a designator. In FIG. 4, seal 10' is similarly mounted within a counterbore 45' and includes a load ring 46' and a seal ring 48'. The seal ring 48' also has a radial flange portion 50'. However, the seal ring 48' is preferably constructed of a rigid material, such as polycarbonate. As a result, seal ring 48' does not require any support from the spacer 44' as the first embodiment did.

The embodiment of FIG. 4 has a dirt shield 74' that is constructed of a resilient polyurethane material as before. In this particular embodiment, however, the dirt shield 74' is only integral with and constructed of the same material as the seal lip 52'. The seal lip 52' and dirt shield 74' are suitably bonded by an adhesive or otherwise secured to the radial flange portion 50' of the seal ring 48' during manufacture to form an integral component of the seal ring, seal lip and dirt shield. The dirt shield 74' has a distal end 76' that is adapted to sealingly contact an end face 84 of the outboard end link portion 18'. The dirt shield 74' has a body portion 82' that is thicker than the bellows 82 of the first embodiment and, in a free state, has the configuration of a belleville-type washer or frustoconical shape that extends radially outwardly from the radial flange portion 50' at an angle toward the end face 84. When the joint 12' is assembled, as joint 12 is depicted in FIG. 1, the frustoconical shape of the body portion 82' of the dirt shield 74' flattens out and acts as a spring to maintain the distal end 76' in sealing engagement against the end face 84.

INDUSTRIAL APPLICABILITY

The seal 10, 10' constructed in accordance with the teachings of the present invention advantageously provides a dirt shield 74, 74' that prevents the ingress of abrasive materials into the counterbore 45 between the seal ring 48, 48' and the load ring 46, 46'. In prior seals, such abrasives materials were known to work their way between the interface between the load ring and seal ring along the radial flange portion 50, 50' and the side surface 60 of counterbore 45. Due to relative back and forth rotary movement between the load ring and the seal ring in response to the torsional forces incurred by the pivoting of the joint 12, 12' during track operation, such abrasives materials caused the erosion of the softer load ring material 46, 46'.

With the dirt shield 74, 74' blocking the ingress of the abrasives materials, the erosion of the load ring 46, 46' is prevented and the axial force of the load ring 46, 46' against the seal ring 48, 48' is maintained throughout the useful life of the seal 10, 10'.

Other aspects, objects and advantages of the present invention can be obtained for a study of the drawings, the disclosure and the appended claims.

We claim:

1. A track joint of a track chain for use with track-type construction machinery, the track joint comprising:

a first link member including a seal bore, an end face and one of a pin and bushing;

a second link member including a sealing end face and the other of said pin and bushing, said pin and said bushing defining an interface therebetween, said second link member being articulately coupled with said first link member by said pin and bushing;

a first seal disposed radially outward of said interface and within said seal bore for preventing ingress of abrasive materials between said pin and bushing, said first seal including a seal ring and a load ring, said seal ring including a seal lip, said load ring urging said seal lip into sealing engagement against said sealing end face;

a second seal disposed between said first link member and said seal ring and extending outwardly from said seal ring and including a distal end and a body portion intermediate said distal end and said seal ring, said body portion, in a free state, including a frusto conical shape and extending at an angle toward said end face of said first link member, said distal end being in sealing engagement with said end face of said first link member and being maintained in said sealing engagement by action of said frusto conical shape of said body, said frusto conical shape flattening out to act as a spring to maintain said distal end in sealing engagement and prevent ingress of abrasive materials between said seal ring and said first member.

2. The track joint of claim 1, wherein said seal ring of said first seal and said second seal are secured one to the other.

3. The track joint of claim 1, wherein said seal lip of said first seal and said second seal are integral one with the other.

4. The track joint of claim 1, wherein said first seal and said second seal are of a unitary construction.

5. The track seal of claim 1, wherein said end face of said first link member further includes an end portion and said distal end of said second seal is in sealing engagement with said end portion.

6. The track seal of claim 2, wherein said seal ring of said first seal is constructed of rigid material and includes a radial flange portion, said seal lip being secured to said radial flange portion.

* * * * *